US00RE35917E

United States Patent [19]

Fischer et al.

[11] E Patent Number: Re. 35,917

[45] Reissued Date of Patent: Oct. 13, 1998

[54] HARVESTING METHOD FOR LEAFY VEGETABLES

[75] Inventors: Rich Fischer, Aromas; Michael T. Jones, Dixon, both of Calif.

[73] Assignee: Fresh Choice Produce, Inc., Salinas, Calif.

[21] Appl. No.: 214,131

[22] Filed: Mar. 17, 1994

Related U.S. Patent Documents

Reissue of:

[64] Patent No.: 4,967,545
Issued: Nov. 6, 1990
Appl. No.: 418,237
Filed: Oct. 6, 1989

[51] Int. Cl.[6] ..... A01D 45/26

[52] U.S. Cl. ..... 56/12.9; 56/327.1; 56/DIG. 2

[58] Field of Search ..... 56/12.9, 12.8, 56/13.1, 13.6, 14.3, 13.2, 13.3, 16.5, 327.1, 328.1, DIG. 8, DIG. 2; 209/905

[56] References Cited

U.S. PATENT DOCUMENTS

| | | | |
|---|---|---|---|
| 1,678,285 | 7/1928 | Falkiner | 56/12.9 |
| 3,070,944 | 1/1963 | Peto et al. . | |
| 3,084,496 | 4/1963 | Leonard et al. . | |
| 3,311,238 | 3/1967 | Huff . | |
| 3,390,768 | 7/1968 | Button | 56/327.1 |
| 3,527,031 | 9/1970 | Winger . | |
| 3,530,652 | 9/1970 | Long et al. . | |
| 3,608,597 | 9/1971 | Hill | 146/117 |
| 3,640,055 | 2/1972 | Looker | 56/106 |
| 3,916,913 | 11/1975 | Looker et al. | 56/327.1 |
| 4,147,017 | 4/1979 | Cortopassi et al. | 56/16.5 |
| 4,194,346 | 3/1980 | Ingalls | 56/328.1 |
| 4,262,477 | 4/1981 | Turold et al. | 56/327.1 |
| 4,364,222 | 12/1982 | Ramacher | 56/328.1 |
| 4,449,352 | 5/1984 | Brown | 56/13.1 |
| 4,519,191 | 5/1985 | Ledebuhr et al. | 56/331 |
| 4,524,573 | 6/1985 | Kinney | 56/330 |
| 4,597,252 | 7/1986 | Williames | 56/130 |
| 4,723,400 | 2/1988 | Williames | 56/130 |
| 4,838,012 | 6/1989 | Bowen, III | 56/13.1 |
| 4,924,662 | 5/1990 | Quick | 56/12.8 |
| 5,024,278 | 6/1991 | Shuknecht | 56/12.8 |

FOREIGN PATENT DOCUMENTS

| | | |
|---|---|---|
| 2 421 685 | 11/1979 | France . |
| 20 58 514 | 5/1972 | Germany . |
| 23 10 171 | 9/1974 | Germany . |
| 29 13 657 | 10/1980 | Germany . |
| 31 11 390 | 10/1982 | Germany . |
| 394001 | 8/1973 | U.S.S.R. . |
| 713559 | 2/1980 | U.S.S.R. . |
| 796351 | 6/1958 | United Kingdom . |

*Primary Examiner*—Terry Lee Melius
*Attorney, Agent, or Firm*—Burns, Doane, Swecker & Mathis, Inc.

[57] ABSTRACT

A mobile harvester of leafy produce has two harvesting sections with a cutter located forwardly for severing the produce from the ground. A continuous belt having a large number of openings moves in a closed path presenting an upwardly facing surface. A low pressure plenum underneath the belt provides a vacuum attraction to the belt upwardly facing for picking up severed produce. An enclosure over the belt protects against wind removal of produce leaves from the belt. The two harvesting sections are individually adjustable for proper height above the ground. *A method for harvesting leafy produce using the mobile harvester is also disclosed.*

5 Claims, 3 Drawing Sheets

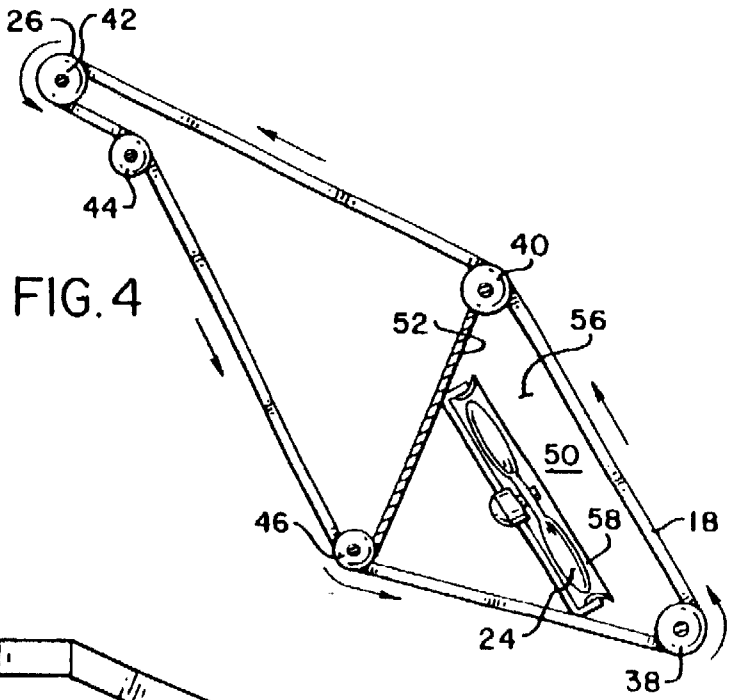
FIG. 4
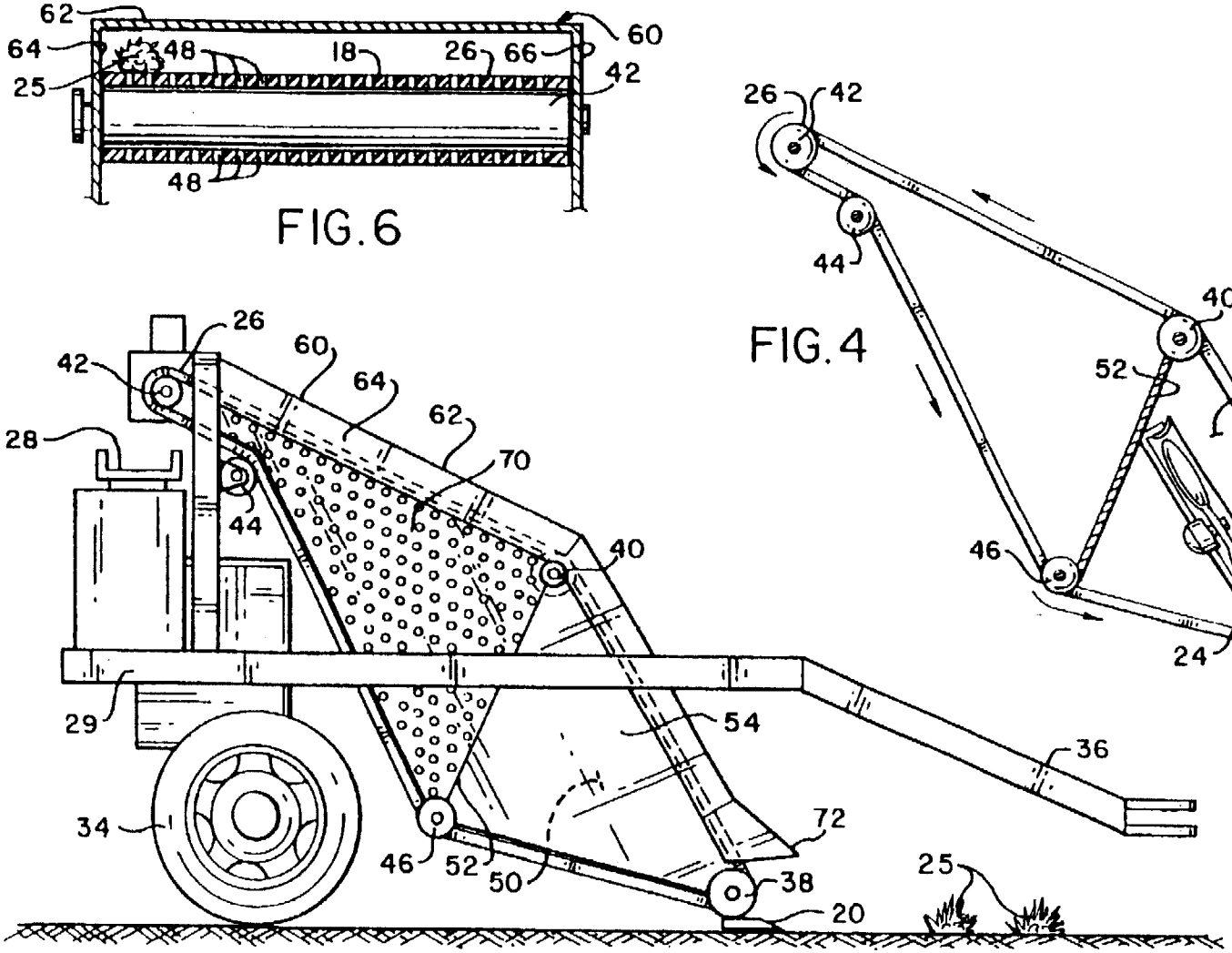
FIG. 3
FIG. 6

HARVESTING METHOD FOR LEAFY VEGETABLES

Matter enclosed in heavy brackets [ ] appears in the original patent but forms no part of this reissue specification; matter printed in italics indicates the additions made by reissue.

*Application Ser. No. 08/214,131, filed Mar. 17, 1994, and application Ser. No. 07/972,320, filed Nov. 5, 1992, are applications which are each a reissue of application Ser. No. 07/418,237, filed Oct. 6, 1989, now U.S. Pat. No. 4,967,545.*

BACKGROUND OF THE INVENTION

1. Field of the Invention

The present invention relates generally to harvesting apparatus, and, more particularly, to such apparatus especially advantageous for use in harvesting leafy vegetables such as spinach, parsley, onion tops or the like.

2. Description of the Related Art

The harvesting of leafy vegetables has in the past, quite difficult, in that it was primarily performed by hand. For example, spinach and other leafy crops must, at the present time, be hand harvested from 40 inch wide beds which is not only arduous, but also a relatively expensive matter. The relatively narrow width of the bed required for hand harvesting has a further adverse effect in producing a correspondingly relatively low yield per square field unit. That is, by merely increasing the width of a planted bed, a corresponding increase in yield per acre can be achieved; however, to increase the bed width requires machine processing.

OBJECTS AND SUMMARY OF THE INVENTION

It is, therefore, a primary aim and object of the present invention to provide harvesting apparatus especially for use in the harvesting of leafy green vegetables such as spinach, for example, which apparatus severs the produce from the ground and transports the leaves directly to a receiving container or to a loading conveyor.

The described apparatus includes mobile (e.g., tractor pulled) equipment consisting of two harvesting sections arranged in side by side relation. Each harvesting unit has a lower leading edge a cutter for severing the produce at some predetermined adjustable height above the ground level. Immediately adjacent the cutter there is an elongated continuous belt having a large number of slots or openings therein and the internal surface of the belt communicates with a low pressure plenum ("vacuum") such that the cut produce leaves will be held to the outer surface of the belt. The belt with the freshly cut produce leaves adhering thereto moves generally upwardly and angularly with respect to the ground until it reaches a maximum height point at which a sprocket redirects the belt angularly downward to return to the produce severing zone at the front.

An enclosure is formed over the belt extending from the cutter to the direction reversal point or produce takeoff point for the belt. The enclosure has a plurality of small openings in a top panel allowing air to make its way directly to the belt (and through) without merely being channeled along the enclosure interior which would tend to produce swirling the could interfere with the vacuum transport of leaves by the belt. The enclosure is also useful in protecting the leaves on the belt from gusts of wind which could, otherwise, dislodge the leaves from the belt, or prevent pickup in the first instance.

The vacuum is broken on the belt substantially before the belt begins to reverse direction so that on beginning direction reversal the vegetable leaves drop into a transport container where the produce is fed to a packaging or further handling station.

By the use of the described mobile apparatus, the leafy vegetable planted bed, instead of being confined to 40 inches which is necessary to enable a human being to manually harvest the produce, can be much wider, namely, approximately 80 inches. The possible yield is increased merely from having a wider planted bed. Of course, the greater speed with which by machine harvesting can be accomplished over hand harvesting also increases overall yield efficiency.

BRIEF DESCRIPTION OF THE DRAWING

In the accompanying drawing:

FIG. 3 is a side elevational view of FIG. 1;

FIG. 4 is a schematic view of the belt and pulley driving arrangement;

FIG. 6 is an enlarged sectional view taken through the transport belt.

DESCRIPTION OF A PREFERRED EMBODIMENT

Figures 1, 2:
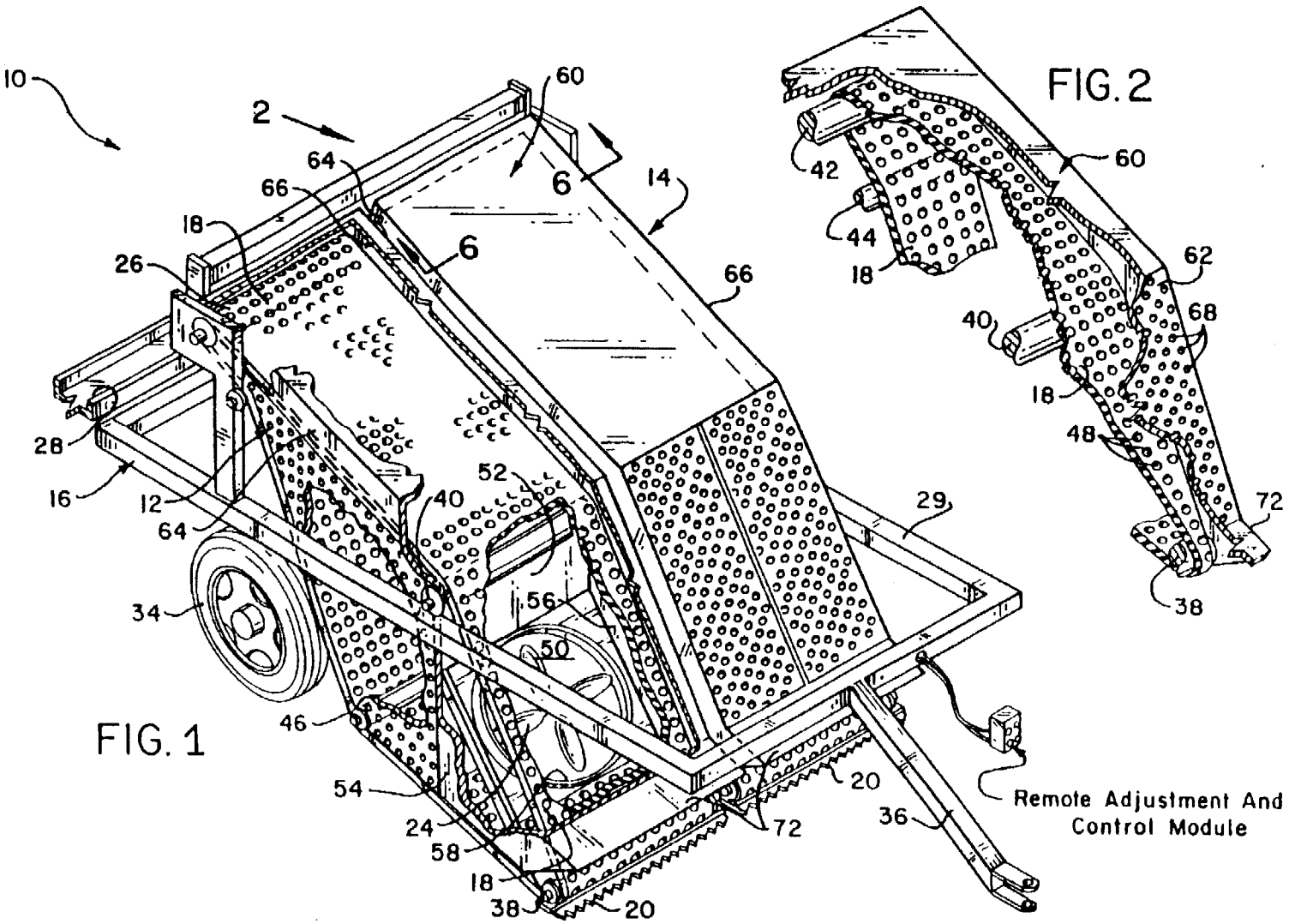
FIG. 1 is a perspective view of the apparatus of the present invention shown adapted for pulling use in a field to be harvested.
FIG. 2 is a cutaway view of FIG. 1 showing a vacuumized belt transporting vegetable leaves.

Turning now to the drawings and particularly FIGS. 1 and 2, the harvesting apparatus to be described, enumerated generally as 10, is contemplated for the cutting of growing leafy vegetables; moving the cut vegetables, by a conveyor of special construction to a removal station; and depositing the produce leaves directly into a container or onto a further conveyor for transporting the produce to a handling station. Although produce harvested in this way can be taken to a remote location and packaged, it is also contemplated that packaging may be accomplished at the machine with the final packaged produce being left for pickup or taken away by vehicle from the field site.

Although the apparatus to be described may be found useful for harvesting a wide variety of produce, it is considered most advantageous for harvesting vegetables such as spinach, parsley, onion tops or the like which have relatively large leaves.

Figure 5:
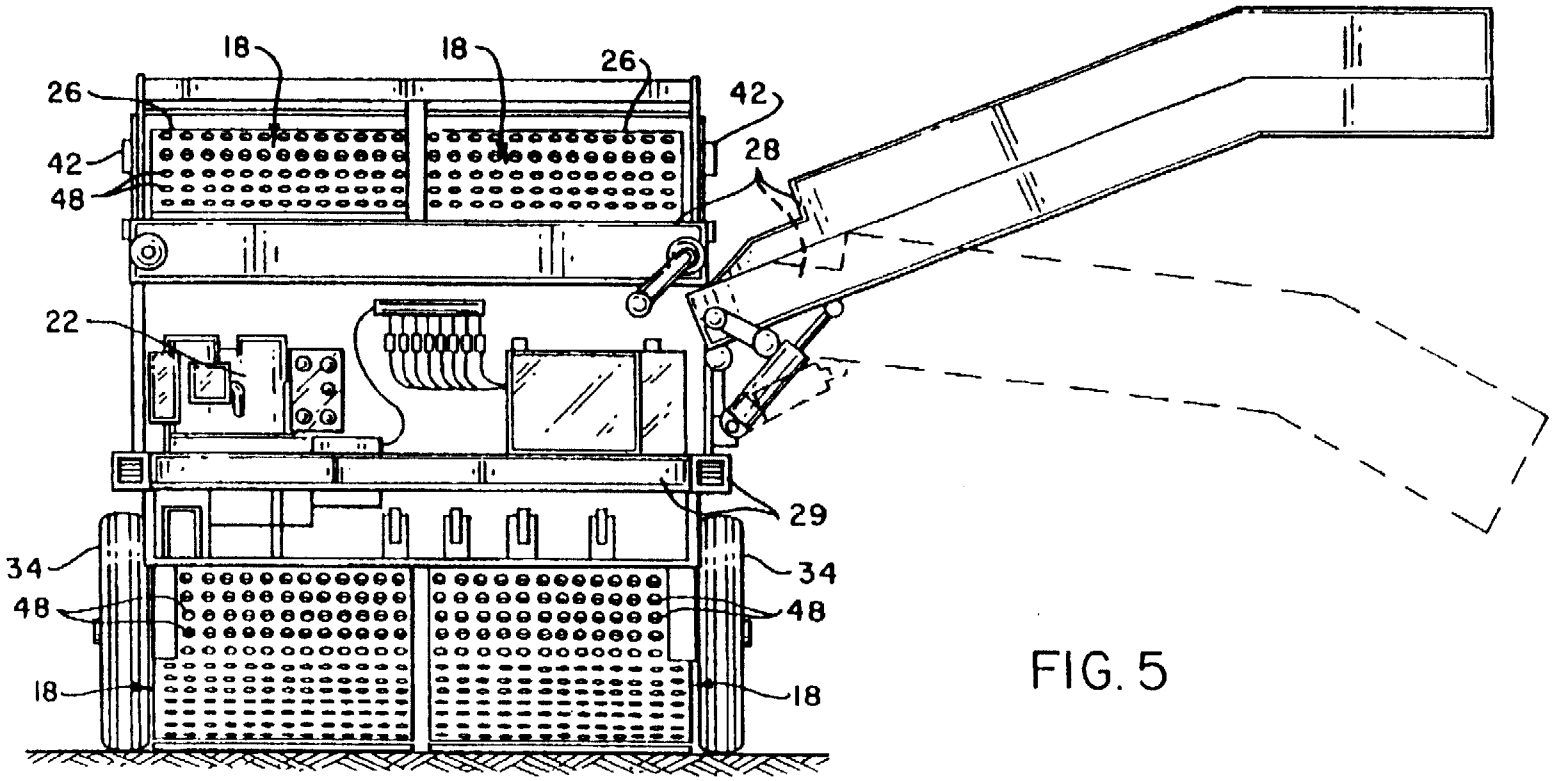
FIG. 5 is a rear elevational view of FIG. 1.

Without reference at this time to constructional details, in its major parts the apparatus 10 includes first and second harvesting sections 12 and 14 mounted onto a wheeled frame 16 which is especially adapted for unitary pulling by a tractor, for example. The two harvesting sections are identical in construction, each including a continuous air-permeable belt 18 driven along a plate from a point just above ground level at the front of the harvesting section to a higher rearwardly located point where it reverses and returns to the front. Just in front of the forwardmost edge of the belt 18 on each harvesting section, there is located a cutter 20 for severing the growing plant from the ground. An engine 22 (FIG. 5) provides rotative power for driving the belt and a fan 24 to produce a vacuum plenum located interiorly of the belt of each section for a purpose to be described.

With respect to general operation of the equipment described to this point, as the equipment moves through the planted field cutters 20 sever the produce from the ground. The belt 18 of each section receives the severed leafy vegetable and as a result of a vacuum plenum being formed and maintained by the fan 24 underneath the belt immediately adjacent the cutter, the produce 25 adheres to the belt outer surface and moves along with it. Vacuumizing of the belt is only maintained for a part of the belt travel, namely, from the cutter partway up the slope leading to the belt uppermost point, identified generally as 26. On the belt and produce reaching the uppermost point and the vacuum terminated, the belt experiences a sharp reversal in direction and the leaves drop into receiving containers (not shown) or, as an alternative, dropped onto a produce conveyor 28 for transport to a packaging or handling station.

Turning now additionally to FIGS. 2 and 3, the frame 16 upon which the entire harvesting apparatus to be described is mounted and by which it is moved about is seen to include a plurality of interconnected I-beams or angle irons 28 mounted onto a pair of wheels 34. At the leading edge of the frame is a tow bar 36 of conventional construction enabling releasable interconnection with the tractor.

It is contemplated that angle irons or I-beams 28 be welded together to form the desired unitary construction.

The continuous belt 18 is mounted on transversely extending sprockets 38, 40, 42, 44 and 46 directing the belt along the path shown best in FIG. 4. Specifically, sprocket 38 is located at the lowermost and most forward position of belt travel. Sprocket 40 is located above sprocket 38 forming a relatively sharply rising portion in the belt expanse between 38 and 40. Next, sprocket 42 defines the highest and most rearward point providing an extent between 40 and 42 of lesser slope than between 38 and 40. The external sprocket 44, serves as a means for adjusting belt tension and is connected to the drive engine for powering belt movement. Sprocket 46 is an idler.

The belt material has a large number of small openings or foramina 48 (FIG. 6). For a total belt width of 67 inches with the described edge supporting technique there is left a continuous relatively unsupported midsection through which pressurized air, in a way that will be described, is drawn forming a vacuum surface approximately 64 inches wide. This vacuum surface width was chosen in order to accommodate a conventional 64 to 68 inch average field planted bed width having furrows for accommodating tractor wheels spaced apart 80 inches which is a typical spacing requirement.

Many belt materials having the necessary foraminous character are commercially available. For example, belt materials constructed of many small interconnected links can be sufficiently air permeable to function in the manner required. In a practical construction of the invention, excellent results were achieved using a belt constructed of a material sold under the trade designation INTRALOX, Series 400, manufactured and sold by Intralox, Inc., which belt material was found on test to have 15% open area.

Underneath the belt at the front there is located a plenum 50 formed by a back wall 52 extending between sprockets 46 and 40 and spaced from the belt lower surface. Side walls 54, 56 are secured to opposite side edges of the back wall 52 and have top edges lying in a single plane closely adjacent the belt undersurface. With the belt in place, the vacuum plenum is formed and the fan 24 located within a shroud 58 and anchored to back wall 52 acts to lower the pressure within the plenum. Since the belt passing over the vacuum plenum has a number of openings 48, there will be a continuous passage of air therethrough forming a vacuum surface on the belt.

An enclosure 60 is located over the belt 18 of each harvesting section extending from just above sprocket 38 to the belt highest point 26. The enclosure includes a top wall 62 and two side walls 64 and 66, the latter being conveniently secured to the frame. A lower portion of the enclosure top wall extending to approximately the sprocket 40 includes a number of uniformly distributed openings 68.

Side panels 70 are secured to the frame and are of such dimensions and geometry as to enclose the lateral space defined by the belt edges and the plenum back wall 52.

The leading edge of the frame can be mounted onto a pair of sled runners, one at each side of the apparatus, of such width and spacing as to slide along the planted bed during use of the apparatus. An alternative to sled runners could be a hydraulic position sensing device for automatically determining and adjusting the height of the plenum, or manual adjustment of the plenum height.

A hood 72 in the form of a solid nose extension is affixed to the lower end of each belt enclosure 60 and extends forwardly of the cutters 20. The hood serves to locate the vacuum effect of the belt ahead of the cutters so as to stand the product up vertically prior to its being cut and to also pull the leaves away from the cutters as rapidly as they are severed.

In operation of the described apparatus, the engine 22 is started and the belt 18 of each harvesting section begins to turn in the direction moving the belt upper surface in a direction from sprocket 38 toward sprocket 40. At the same time, the fans 24 are driven to produce a vacuum within the plena 50 such that a vacuum securing surface is produced at the belt upper surface, while at the same time a tractor pulls the apparatus in the direction of the arrow through a planted field. The cutter 20 severs the leafy vegetables at a point immediately adjacent the forward end of the vacuumized belt 18 such that the leaves immediately adhere to the belt and are carried along by the belt.

By the described apparatus an 80 inch planted bed can be harvested in one pass. The reason two harvesting sections, each approximately 40 inches wide, are required is to negotiate uneven ground or sinking of the wheels on one side more than the other. For example, a commonly encountered situation, particularly on irrigated fields, is that one furrow may be watered more than the adjacent one which causes the wheels to sink on the one side more than the other. Having two relatively narrow harvesting sections enables readily making vertical adjustments where needed of just one section or of amounts for the two sections. It can be readily appreciated that even moderate lifting of the hood can produce a prohibitive loss in vacuum pull on the severed produce leaves with corresponding drop in harvesting efficiency.

The enclosure 60 over the belt protects the leaves being carried by the belt from being removed from the belt by gusts of wind, for example. Also, the openings 68 in the enclosure top wall allow some air induced by the fan action to come through the openings 68 rather than just through the larger opening at the hood. In this way, a strong draft parallel to the belt is avoided which could blow the leaves loose.

Openings in the side panels 70 are important in order to assist in removing the air produced by fans 24. Otherwise, sufficient back pressure could be exerted on the belt to blow the leaves loose.

Although the invention has been described in connection with a preferred embodiment, it is to be understood that those skilled in the appertaining art could devise of modifications that if used would still be in accordance with the spirit of the invention as described in the appended claims.

What is claimed is:

[1. Apparatus for harvesting leafy produce, comprising:

a wheeled frame for ground based movement having a front end, a rear end and sides, said frame carrying first and second harvesting sections, each section including, cutter means mounted on located adjacent the front end of the frame for severing produce from the ground;

a belt arranged in a closed loop and presenting an upwardly directed surface extending from a point just rearward of the cutter means to a point farthest to the rear, said belt on reaching the point farthest to the rear reverses its direction on the loop presenting its outer surface downwardly from the point farthest to the rear until the point just rearward of the cutter means, said belt having a large number of openings uniformly distributed over the belt surface;

side walls located adjacent the belt loop forming a plenum with the belt upwardly directed surface;

fan means mounted under the belt upwardly directed surface for removing air from the plenum and forming a vacuum region adjacent the belt upwardly directed surface; and drive means interconnected to the fan means and belt.]

[2. Apparatus as in claim 1, in which an enclosure is provided having a top wall located over the belt and having side walls secured to the frame, a portion of the top wall positioned adjacent the cutter means and having a plurality of openings therein.]

[3. Apparatus as in claim 2, in which a hood is connected to the enclosure adjacent the cutter means, said hood having portions thereof extending over and forwardly of said cutter means.]

[4. Apparatus as in claim 1, in which the belt openings are about 15% of the belt surface.]

[5. Apparatus as in claim 1, in which the frame has at least two wheels spaced apart approximately 80 inches.]

[6. Apparatus as in claim 1, in which the cutter means is a sickle-bar cutter.]

[7. Apparatus as in claim 1, in which the belt upwardly directed surface moves a predetermined amount at a first angle with respect to the horizontal and then at a second lesser angle with respect to horizontal until it reaches the belt farthest to the rear point.]

*8. A method of harvesting leafy produce growing out of the ground comprising the steps of:*

*severing a row of leafy produce closely adjacent an outwardly directed surface of a moving perforated endless transport member through use of a cutter means;*

*attracting and holding the severed leafy produce to the outwardly directed surface of the moving perforated endless transport member by generating a vacuum within an interior space enclosed by the perforated endless transport member;*

*transporting the severed leafy produce held on the perforated endless transport member upwardly away from the cutter means through movement of the perforated endless transport member; and*

*removing the severed produce from the outwardly directed surface of the perforated endless transport member by transporting the severed produce to a point where the severed produce is no longer attracted and held to the outwardly directed surface of the perforated endless transport member by the vacuum.*

*9. The method according to claim 8, wherein the severed produce is removed from the outwardly directed surface of the perforated endless transport member by confining the vacuum to a portion of the interior space.*

*10. The method according to claim 8, wherein the severed produce is transported towards a rearwardmost point of the perforated endless transport member relative to said cutter means while being transported upwardly away from the cutter means.*

*11. The method according to claim 10, wherein the severed produce is removed from the outwardly directed surface of the perforated endless transport member substantially when said severed produce reaches said rearwardmost point.*

*12. The method according to claim 8, wherein said vacuum is generated within the interior space enclosed by the perforated endless transport member through the operation of a fan positioned within said interior space.*

* * * * *